(12) United States Patent
Cheng et al.

(10) Patent No.: US 10,666,495 B2
(45) Date of Patent: *May 26, 2020

(54) TRANSACTION PROCESSING

(71) Applicant: INTERNATIONAL BUSINESS MACHINES CORPORATION, Armonk, NY (US)

(72) Inventors: Ping Ping Cheng, Beijing (CN); Jun Hua Gao, Beijing (CN); Guan Jun Liu, Beijing (CN); Xue Yong Zhang, Beijing (CN); Bei Chun Zhou, Beijing (CN); Xi Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/682,937

(22) Filed: Aug. 22, 2017

(65) Prior Publication Data

US 2019/0068435 A1 Feb. 28, 2019

(51) Int. Cl.
*H04L 12/24* (2006.01)
*G06F 9/46* (2006.01)
*H04L 12/26* (2006.01)
*G06F 9/50* (2006.01)

(52) U.S. Cl.
CPC .......... *H04L 41/0654* (2013.01); *G06F 9/466* (2013.01); *H04L 41/0806* (2013.01); *H04L 41/12* (2013.01); *H04L 43/0876* (2013.01); *G06F 9/5083* (2013.01); *H04L 41/5006* (2013.01)

(58) Field of Classification Search
CPC . H04L 41/0654; H04L 41/0806; H04L 41/12; H04L 41/5006; H04L 43/0876; G06F 9/466; G06F 9/5061

USPC ........................................................ 709/223
See application file for complete search history.

(56) References Cited

U.S. PATENT DOCUMENTS

| 5,781,910 A * | 7/1998 | Gostanian ............. G06F 11/202 |
| | | 707/610 |
| 6,205,464 B1 | 3/2001 | Cobb et al. |
| 6,735,200 B1 * | 5/2004 | Novaes ............... H04L 12/1854 |
| | | 370/390 |

(Continued)

OTHER PUBLICATIONS

Abuya et al., "An Improved Failure Recovery Algorithm in Two-Phase Commit Protocol for Transaction Atomicity", Journal of Global Research in Computer Science (JGRCS), Research Paper, Available Online at www.jgrcs.info, vol. 5, No. 12, Dec. 2014, copyright JGRCS 2010, All Rights Reserved, pp. 1-11.

(Continued)

*Primary Examiner* — Ruolei Zong
(74) *Attorney, Agent, or Firm* — L. Jeffrey Kelly

(57) ABSTRACT

According to an embodiment of the present disclosure, there is provided a method for a distributed transaction processing environment. The method includes in response to determining that a state of a first node acting as a first coordinating node is not performing properly, selecting a second node from a first plurality of participating nodes communicatively coupled to the first node. The method further includes activating the selected second node to be a second coordinating node while deactivating the first node to be a participating node. In addition, the method includes performing a transaction based on a cooperation between the first and second nodes.

5 Claims, 8 Drawing Sheets

(56) References Cited

U.S. PATENT DOCUMENTS

| | | |
|---|---|---|
| 7,478,400 B1 | 1/2009 | Banerjee et al. |
| 7,873,604 B2 | 1/2011 | Little |
| 8,276,141 B2 | 9/2012 | Kaczynski et al. |
| 8,650,272 B2 | 2/2014 | Myers |
| 9,165,025 B2 | 10/2015 | Maple et al. |
| 9,348,841 B2 | 5/2016 | Fang |
| 2006/0095438 A1* | 5/2006 | Fachan ............... G06F 16/1865 |
| 2006/0174224 A1* | 8/2006 | Parkinson ............... G06F 9/466 717/120 |
| 2006/0190243 A1* | 8/2006 | Barkai ................ G06F 16/278 704/8 |
| 2007/0013419 A1* | 1/2007 | Ayyagari ............. H04L 41/044 327/156 |
| 2009/0292744 A1* | 11/2009 | Matsumura ............. G06F 16/27 |
| 2010/0189014 A1* | 7/2010 | Hogan ............. H04L 29/12103 370/255 |
| 2013/0117307 A1* | 5/2013 | Vishnoi ............... G06F 16/2343 707/770 |
| 2013/0204960 A1* | 8/2013 | Ashok .................... G06F 15/17 709/213 |
| 2015/0248308 A1 | 9/2015 | Little |
| 2016/0232198 A1* | 8/2016 | Fang ...................... G06F 9/542 |

OTHER PUBLICATIONS

Mell et al., "The NIST Definition of Cloud Computing," U.S. Department of Commerce, National Institute of Standards and Technology, Sep. 2011, p. 1-7, Special Publication 800-145.

Cheng et al., "Transaction Processing", U.S. Appl. No. 15/823,057, filed Nov. 27, 2017.

List of IBM Patents or Patent Applications Listed as Related. Filed Nov. 27, 2017. 2 pages.

* cited by examiner

TRANSACTION PROCESSING

BACKGROUND

The present disclosure relates to transaction processing, and more specifically, to a method, device and computer program product for transaction processing.

In transaction processing, a Two Phase Commit (hereinafter "2PC") protocol is widely used. The 2PC protocol is a type of atomic commitment protocol, which can be used to maintain data consistency in a distributed transaction environment where a plurality of transaction managers (hereinafter "TM"s) and a set of resource managers (hereinafter "RM"s) work together as a unit of work. The 2PC protocol can appoint a TM in the distributed transaction environment as a coordinator, and appoint other TMs as participants. In the first phase of 2PC, the coordinator attempts to prepare all of the participants associated with a transaction to take necessary steps for either committing or aborting the transaction. Each of the participants can reply either "YES" for committing the transaction, or "NO" for aborting the transaction. In the second phase of 2PC, the coordinator makes a decision on whether to commit or abort the transaction and sends the decision to all of the participants. In response to receiving the decision from the coordinator, each of the participants executes an operation accordingly.

However, before sending out the decision, the coordinator may have a failure. In this case, the participants may wait for an extended period of time for the decision from the coordinator. This may impact performance of the transaction processing, since the participants will not release shared resources during the waiting time. Additionally, if the coordinator has sent the decision to a subset of the participants and then fails, the subset of the participants will execute the decision while remainder of the participants may have to make a heuristic decision until time out. The heuristic decision may be opposite to the decision made by the coordinator, resulting in inconsistency of data.

SUMMARY

According to an embodiment of the present disclosure, a method is provided for a distributed transaction processing environment. The method includes the following, in response to determining that a state of a first node acting as a first coordinating node is not performing properly, selecting a second node from a first plurality of participating nodes communicatively coupled to the first node. The method further includes activating the selected second node to be a second coordinating node while deactivating the first node as a participating node. In addition, the method includes performing a transaction based on a cooperation between the first and second nodes.

According to an embodiment of the present disclosure, a device is provided for a distributed transaction processing environment. The device includes a candidate selecting module configured to, in response to determining that a state of a first node acting as a first coordinating node is not performing properly, select a second node from a first plurality of participating nodes communicatively coupled to the first node. The device further includes a role switching module configured to activate the selected second node to be a second coordinating node while deactivating the first node to be a participating node. In addition, the device includes a transaction processing module configured to execute a transaction to be performed based on a cooperation between the first and second nodes.

According an embodiment of the present disclosure, a computer program product is provided which includes a computer readable storage medium having program instructions embodied therewith, the program instructions executable by a device to perform a method for a distributed transaction processing environment. The method includes, in response to determining that a state of a first node acting as a first coordinating node is not performing properly, selecting, by the device, a second node from a first plurality of participating nodes communicatively coupled to the first node. The method further includes activating, by the device, the selected second node to be a second coordinating node while deactivating the first node to be a participating node. In addition, the method further includes executing, by the device, a transaction to be performed based on a cooperation between the first and second nodes.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Throughout the drawings, the same or similar reference numerals represent the same or similar element.

DETAILED DESCRIPTION

Figure 1:
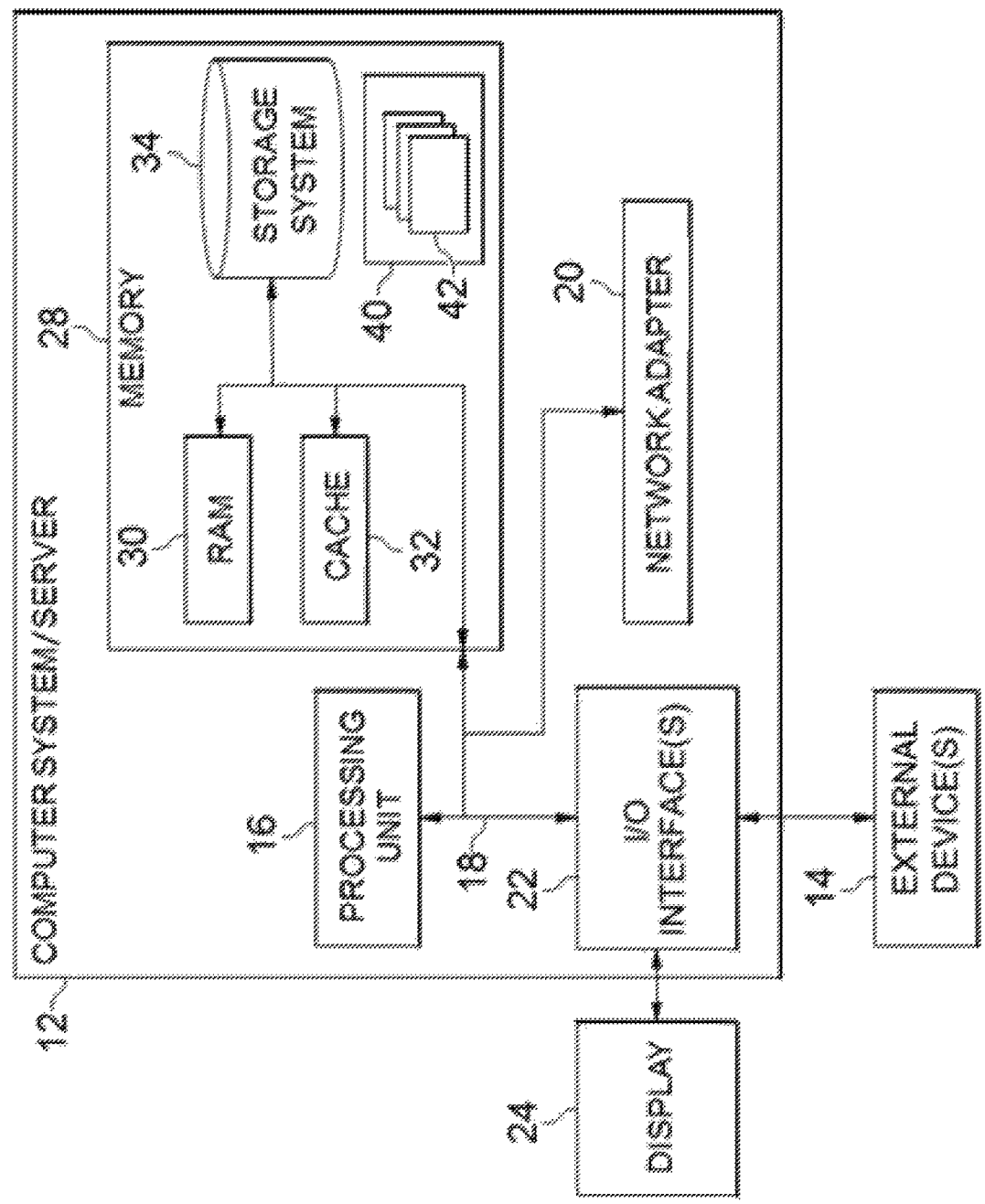
FIG. 1 depicts a block diagram of internal and external components of computers and servers according to an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. The cloud computing node is an example of a suitable cloud computing node and is not intended to suggest any limitation as to the scope of use or functionality of embodiments of the invention described herein. Regardless, the cloud computing node is capable of being implemented and/or performing any of the functionality set forth hereinabove.

In the cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 may generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
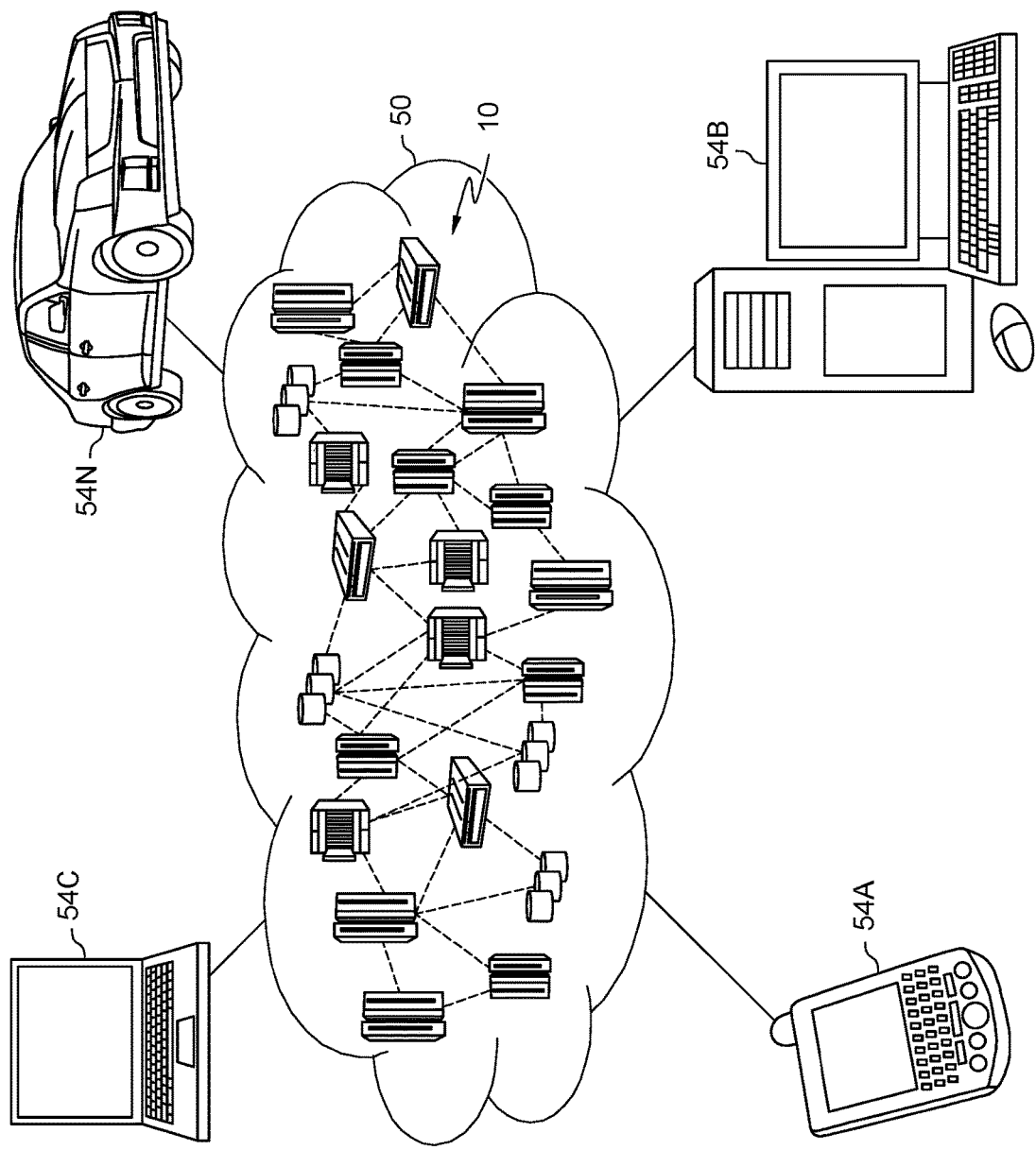
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. The one or more cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and the one or more cloud computing nodes 10 and the cloud computing environment 50 can communicate with any type of computerized device over any type of network and/or network addressable connection (e.g., using a web browser).

Figure 3:
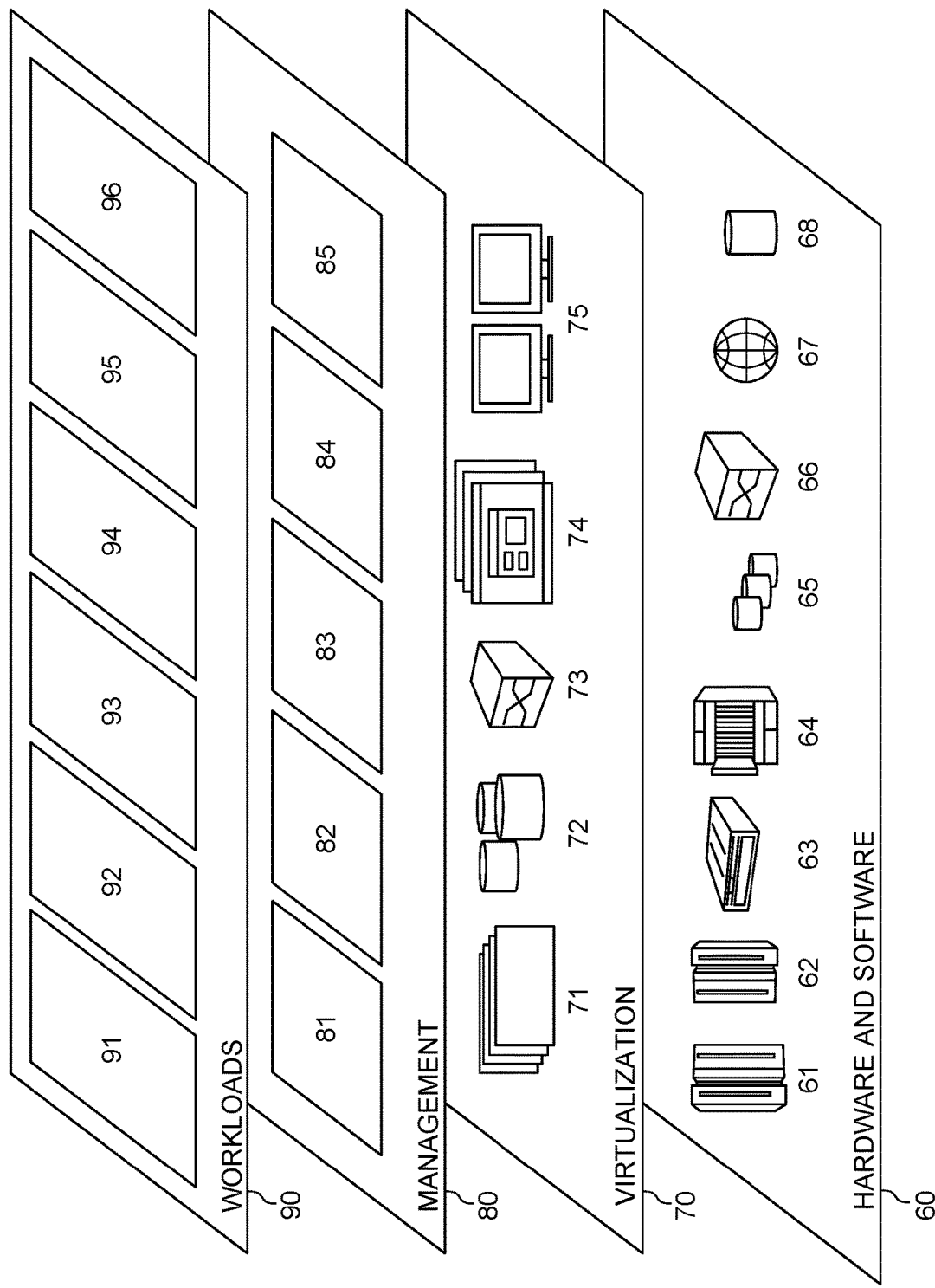
FIG. 3 depicts abstraction model layers according to an embodiment of the present invention.

Referring now to FIG. 3, a set of functional abstraction layers provided by cloud computing environment 50, as shown in FIG. 2, is shown. It may be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In an embodiment, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In an example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed transaction processing 96.

Figure 4:
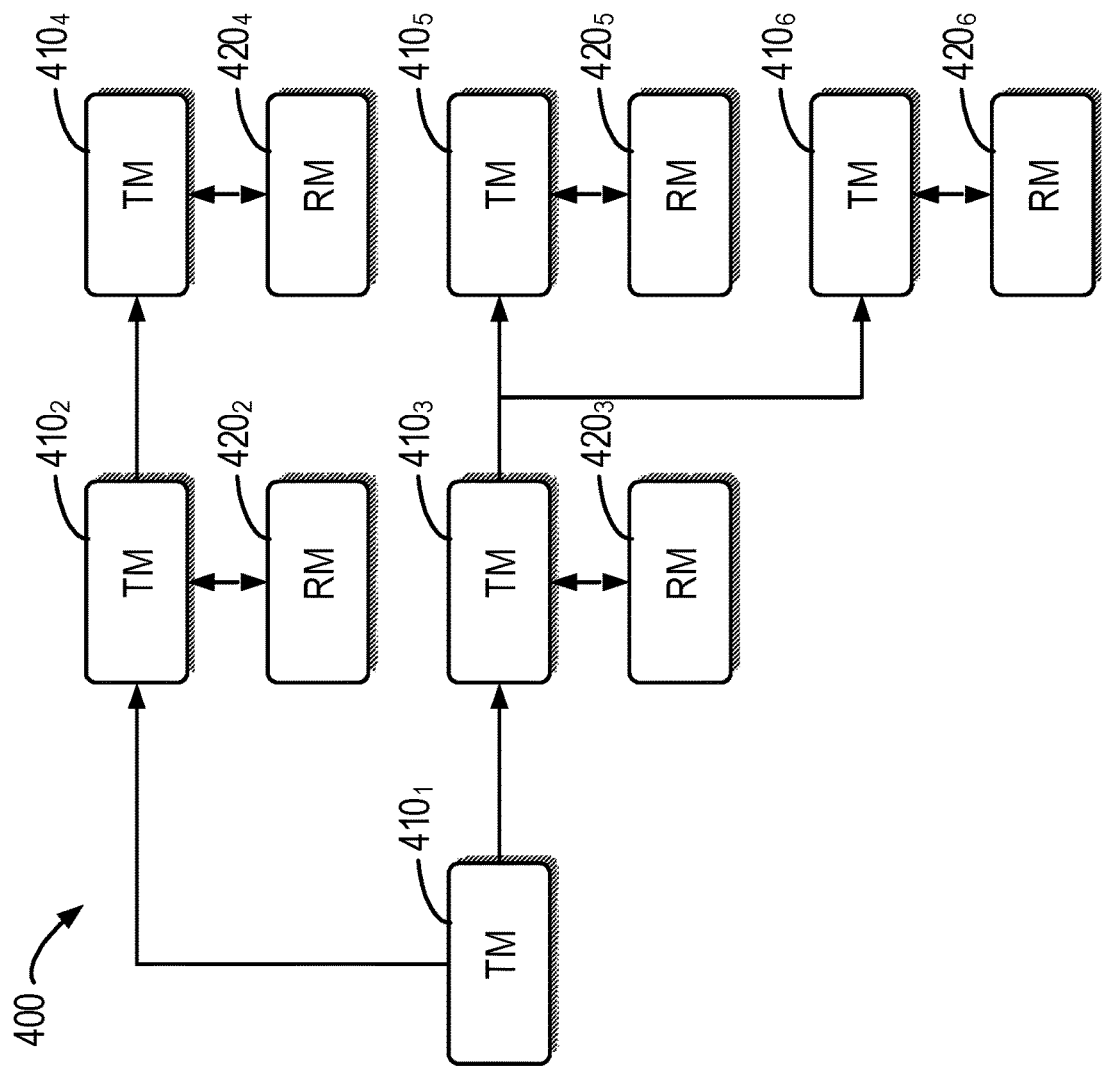
FIG. 4 illustrates an environment 400 according to an embodiment of the present invention.

Referring now to FIG. 4, an environment 400 in which embodiments of the present disclosure can be implemented is shown. It is to be understood that the structure and functionality of the environment 400 are described only for the purpose of illustration without suggesting any limitations as to the scope of the present disclosure. Embodiments of the present disclosure can be embodied with a different structure and/or functionality.

As shown, the environment 400 may be an environment for processing a distributed transaction. As used herein, the term "distributed transaction" is a transaction in which two or more processing nodes (such as physical devices or virtual machines) are involved. Usually, the two or more processing nodes may provide transactional resources, while an application called a transaction manager (hereinafter "TM") is responsible for creating and managing the entire transaction that encompasses all operations against such resources.

In FIG. 4, the environment 400 is shown to include six TMs $410_1$, $410_2$, ... $410_6$ (collectively referred to as TMs 410). This is merely for the purpose of illustration, without suggesting any limitation to a number of TMs in the environment 400. In an embodiment, a TM 410 may be implemented by a physical device or a virtual machine. For example, the TM 410 may be implemented by computer system/server 12 as discussed with reference to FIG. 1. In an embodiment, the TM 410 may be implemented as a software program executed on a processing node, which manages the entire transaction and provides transaction services for an application. As shown in the environment 400, the TMs 410 may be interconnected with each other by any suitable wired and/or wireless mechanism, for example, via a network such as Internet.

In an embodiment, a TM 410 may be associated with a respective resource manager (hereinafter "RM"). For example, in FIG. 4, the environment 400 is shown to include five RMs $420_2$, $420_3$, ... $420_6$ (collectively referred to as RMs 420). In this example, each of the TMs 410, except for the TM $410_1$, is associated with one RM. Specifically, the TM $410_2$ is associated with RM $420_2$, the TM $410_3$ is associated with RM $420_3$, ... and the TM $410_6$ is associated with RM $420_6$. It is to be understood that this is merely for the purpose of illustration, and the scope of the present disclosure is not limited thereto. For example, in another embodiment, the TM $410_1$ may also be associated with a RM.

As used herein, the term "resource manager" may refer to an application for managing specific transactional resources, such as databases, files, queues or the like. In an embodiment, a RM 420 may be implemented by a physical device or a virtual machine. For example, the RM 420 may be implemented by computer system/server 12 as discussed with reference to FIG. 1. In an embodiment, the RM 420 may be implemented as a software program executed on a processing node, for example.

A distributed transaction, as any other transactions, must have four properties which include atomicity, consistency, isolation and durability (hereinafter "ACID"). An atomic transaction is an indivisible series of database operations, where all operations occur or none occur. A guarantee of atomicity prevents partial database updates. A consistency in a database means any database transaction must follow all defined rules, keeping all database values in a valid state. Isolation ensures that a result of concurrent execution of transactions is the same result of sequential execution of transactions. Making the transaction durable is the ACID property which guarantees that a transaction which have committed will be permanent. For example, a reservation will remain even after a system failure.

A common protocol for ensuring correct completion of a distributed transaction is a Two Phase Commit (hereinafter "2PC") protocol, which can be applied in the environment 400. In the 2PC protocol, there may be a TM acting as a coordinator (also referred to as "coordinating node", or "transaction manager") as a leader of the other TMs at one time in a single transaction. Each of the other TMs may act as a participant (also referred to as "participating node"). For example, in FIG. 4, the TM $410_1$ may act as the coordinator, while the TMs $410_2$, $410_3$ ... $410_6$ may each act as a participant.

In a traditional execution of a single distributed transaction, the 2PC protocol may consist of two phases. A first phase may be referred to as a voting phase or a commit-request phase. In the first phase, once the TM functioning as the coordinator, for example, the TM $410_1$, receives a request for committing a transaction, the coordinator may send a prepare command to each of the participants involved in the transaction (for example, the TMs $410_2$, $410_3$ ... $410_6$). Each of the participants may then perform tasks required to make the transaction durable, and all memory buffers holding log images for the transaction are flushed to a memory disk. As each of the participants completes the prepare phase, it may return to the coordinator a success or a failure for the preparing. The success may be a vote yes, or a commit, from each of the participants. The failure may be a vote no, or an abort, from each of the participants. A second phase may be referred to as a commit phase. In the second phase, if the coordinator, for example, the TM $410_1$, receives a yes, or a commit, from each of the participants (for example, the TMs $410_2$, $410_3$ ... $410_6$), then the coordinator may send a commit command to each of the participants for committing the transaction. In response to receiving the commit command, the participants may then execute corresponding operations for committing the transaction. However, if any of the participants reports a no, or abort, the transaction manager, may send a rollback command to each of the participants for aborting the transaction. In response to receiving the rollback command, for example, the TMs $410_2$, $410_3$ ... $410_6$, may execute some necessary operations for rollback of the aborted transaction.

However, before sending out the commit or rollback command, the coordinator may fail. In this case, the participants may wait for a long time for a command from the coordinator, for example, the TM $410_1$, to either execute or abort. This may impact performance of the transaction processing because the participants, for example, the TMs $410_2$, $410_3$ ... $410_6$, will not release shared resources during a waiting time. Even worse, if the coordinator has sent a commit command to only part of the participants (for example, the TMs $410_2$ and $410_3$) and then the coordinator fails, the TMs $410_2$ and $410_3$ may complete committing the transaction while the TMs $410_4$, $410_5$ and $410_6$ may have to make a heuristic decision until time out. In some cases, the heuristic decision may be opposite to the decision made by the TM $410_1$. For example, the TMs $410_4$, $410_5$ and $410_6$ may rollback the transaction to unlock shared resources until time out instead of committing the transaction, which may be performed by the TMs $410_2$ and $410_3$. This may result in inconsistency of data.

In order to solve the problems above and one or more of other potential problems, a solution for switching the role of a coordinator in the 2PC protocol is provided in accordance with an embodiment of the present disclosure. With the solution, the coordinator may check its own healthy state before it starts the 2PC. Once the coordinator finds itself not healthy enough, it may determine an alternate TM may function as a coordinator and activate the alternate TM to be a new coordinator. Then, the original coordinator may act as a participant and work with the new coordinator to perform the transaction.

Figure 5:
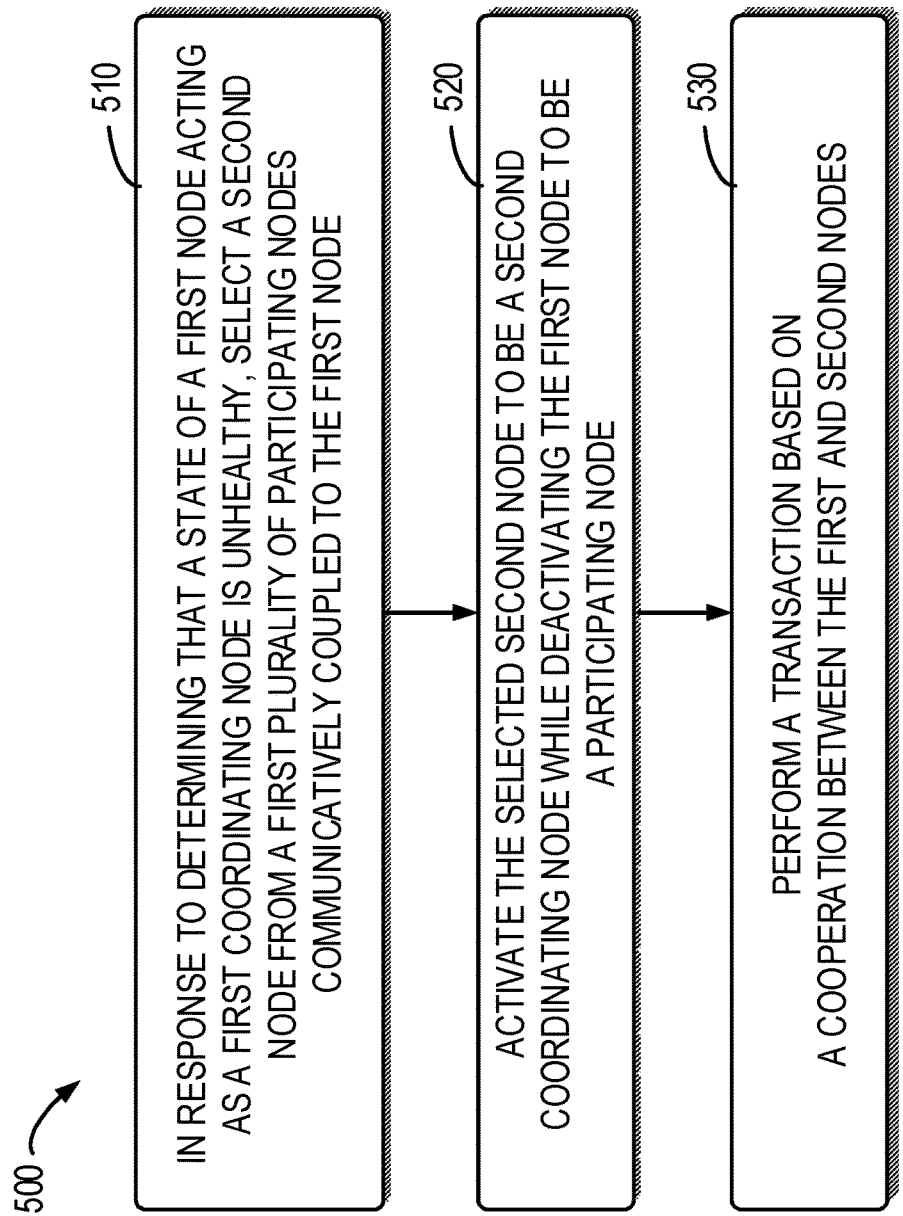
FIG. 5 illustrates a flowchart of a method 500 for transaction processing according to an embodiment of the present invention.

More details of embodiments of the present disclosure will now be discussed hereafter with reference to FIGS. 5 to 8. FIG. 5 shows a flowchart of a method 500 for transaction processing in accordance with an embodiment of the present disclosure. The method 500 will be described in connection with the environment 400 shown in FIG. 4. For example, in an embodiment, the method 500 may be performed by the TM $410_1$ in the environment 400. It should be understood that the method 500 may also comprise additional steps (not shown) and/or may omit the illustrated steps. The scope of the present disclosure described herein is not limited in this aspect. Only for the purpose of illustration, in the following discussions, the TM $410_1$ is also referred to as the "first node" or "first coordinating node". The TMs $410_2$, $410_3$ ... $410_6$ are also referred to as the "first plurality of nodes" or "first plurality of participating nodes".

In block 510, in response to determining its state is not performing properly, the TM $410_1$ selects a second node from the first plurality of participating nodes communicatively coupled to the TM $410_1$.

In an embodiment, the TM $410_1$ may determine its state in response to receiving an incoming request for performing a transaction (such as committing the transaction). That is, the TM $410_1$ may determine its state before starting the 2PC.

In an embodiment, the TM $410_1$ may determine its state, or whether or not it is in a healthy state, based on its utilization of a processor. For example, if utilization of a central processing unit associated with the TM $410_1$ exceeds a first threshold, the TM $410_1$ may determine itself to be not performing properly, or may be not in a healthy state. Alternatively, or in addition, in an embodiment, the TM $410_1$ may determine its state based on its utilization of storage. For example, if the utilization of a memory or a storage device associated with the TM $410_1$ exceeds a second threshold, the TM $410_1$ may determine itself to be not performing properly. Alternatively, or in addition, in an embodiment, the TM $410_1$ may determine its state based on associated network quality. For example, in a case that the TM $410_1$ is implemented by computer system/server 12 as discussed with reference to FIG. 1, the TM $410_1$ may determine its state based on network quality of computer system/server 12. If the network quality deteriorates (for example, network latency exceeds a third threshold), the TM $410_1$ may determine itself to be not performing properly. Alternatively, or in addition, in an embodiment, the TM $410_1$ may determine its state based on an associated input and output (IO) status. For example, if the number of IO errors associated with the TM $410_1$ exceeds a fourth threshold, the TM $410_1$ may determine itself to be not performing properly. It should be understood that the TM $410_1$ may also determine its state based on other factors. The scope of the present disclosure described herein is not limited in this aspect. In an absence of any determination that the TM $410_1$ is in an unhealthy state, then the TM $410_1$ may be determined to be in a healthy state, operates well, or performs properly.

Figure 6:
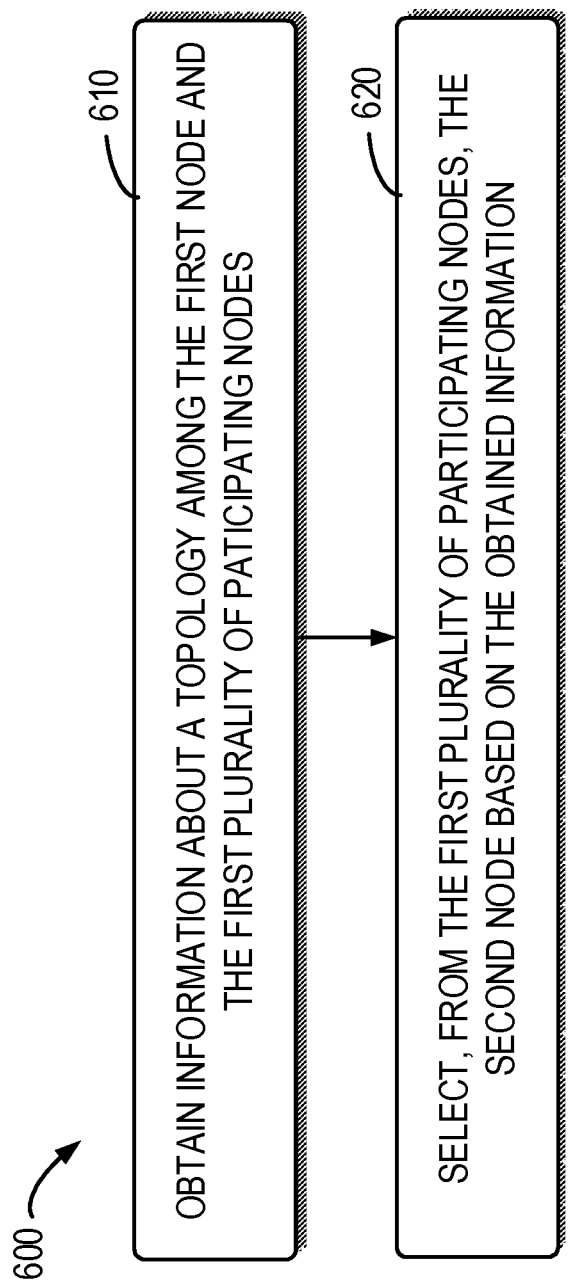
FIG. 6 illustrates a flowchart of a method 800 for selecting a candidate for the coordinating node in accordance with an embodiment of the present invention.

In an embodiment, in response to determining that the state of the TM $410_1$ is not performing properly, the TM $410_1$ may select a candidate for the coordinating node. For example, FIG. 6 shows a flowchart of a method 600 for selecting a candidate for the coordinating node in accordance with an embodiment of the present disclosure. The method 600 will be described in connection with the environment 400 shown in FIG. 4. For example, in an embodiment, the method 600 may be performed by the TM $410_1$ in the environment 400. It should be understood that the method 600 may also comprise additional steps (not shown) and/or may omit the illustrated steps. The scope of the present disclosure described herein is not limited in this aspect.

Figure 7:
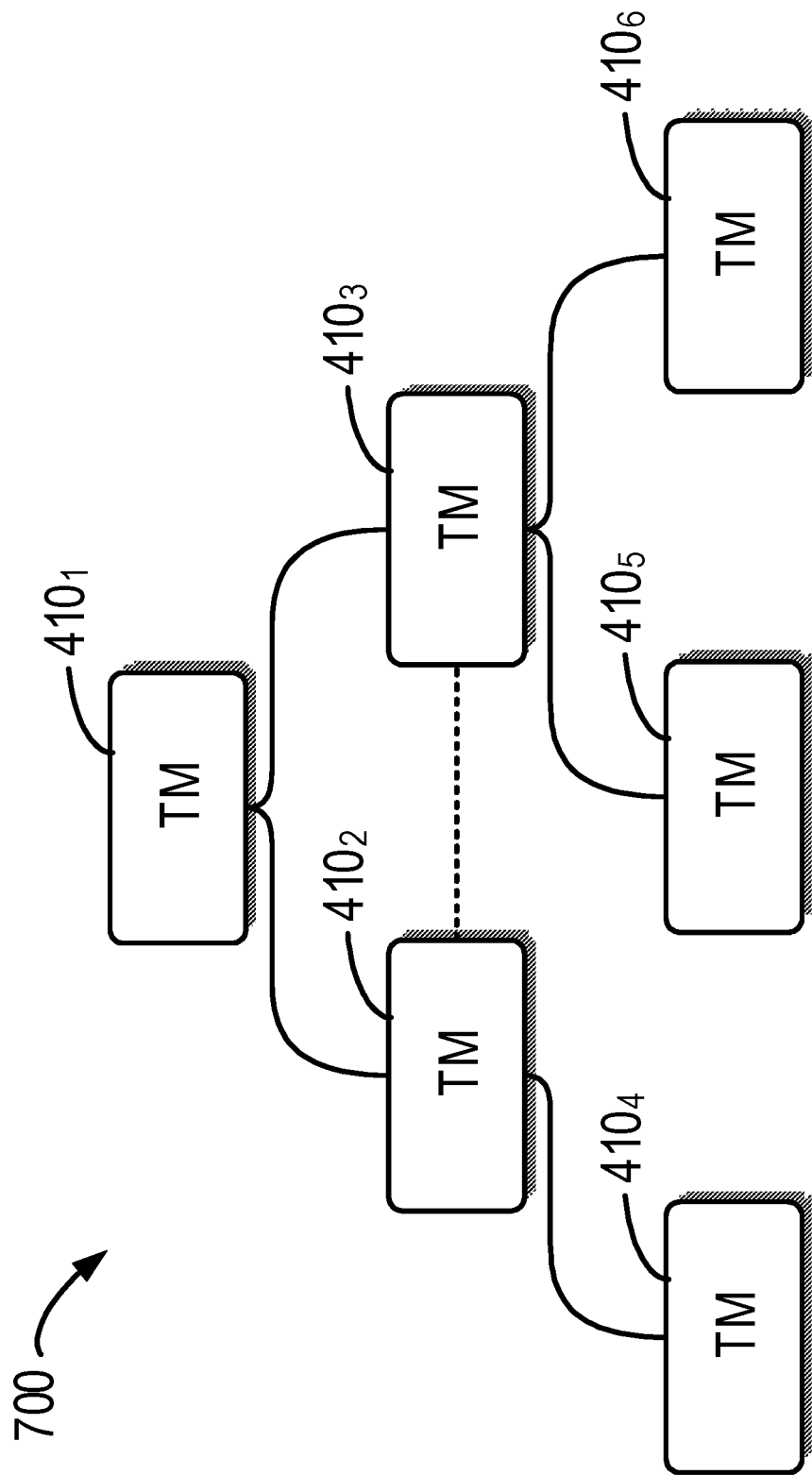
FIG. 7 illustrates a schematic diagram illustrating the topology 700 of the environment 400, in accordance with an embodiment of the present invention.

In block 610, the TM $410_1$ obtains information about a topology among the first node and the first plurality of participating nodes. The topology among the first node and the first plurality of participating nodes may be treated as a tree-like structure. For example, FIG. 7 is a schematic diagram illustrating the topology 700 of the environment 400. As shown in FIG. 7, the TM $410_1$ may act as a root node of the tree, while the TMs $410_2$ and $410_3$ are leaf nodes of the TM $410_1$. Similarly, the TM $410_4$ may act as a leaf node of the TM $410_2$, while the TMs $410_5$ and $410_6$ are leaf nodes of the TM $410_3$.

In an embodiment, the information obtained by TM $410_1$ may include node information associated with each of the first plurality of participating nodes. Referring to the TM $410_3$ as an example, the node information may indicate if the TM $410_3$ is qualified for a coordinating node. In an embodiment, the node information may include information on whether the TM $410_3$ is read-only. If the TM $410_3$ is read-only, it may be unqualified for a coordinating node. The coordinating node should have the capability of being updated, or written to. Additionally, the node information may include information on a health state of the TM $410_3$. For example, the information on the health state of the TM $410_3$ may include utilization of a processor, utilization of a memory or a storage device, network quality, an IO status and/or other factors associated with the TM $410_3$. In an embodiment, if the TM $410_3$ is in a not performing properly state, it may be unqualified for a coordinating node. It is to be understood that the health state of the TM $410_3$ can be determined as that of the TM $410_1$, which will not be further detailed here.

In an embodiment, the information obtained by the TM $410_1$ may include connection information associated with each of the first plurality of participating nodes. For example, the information obtained by the TM $410_1$ may include intercommunication information among its leaf nodes (which are the TMs $410_2$ and $410_3$). In an embodiment, in response to determining that the TMs $410_2$ is communicatively unconnected to the TMs $410_3$, the TM $410_1$ may coordinate the TMs $410_2$ and $410_3$ to set up a connection between each other as shown in FIG. 7 by the dashed line. As such, even if the TM $410_1$ fails later, the first plurality of participating nodes are communicatively interconnected with each other.

In an embodiment, the information obtained by the TM $410_1$ may include network overhead associated with each of the first plurality of participating nodes. For example, the network overhead associated with a participating node can be determined based on network latency and/or the number of hops from the participating node to another node within the environment 400. Alternatively, or in addition, the network overhead associated with a participating node may also be determined based on, for example, packet loss rate, current workload, response time and/or some other factors associated with the participating node. For example, if the packet loss rate of the participating node is relatively high, it may indicate relatively high network overhead associated with the participating node. Similarly, relatively high workload and/or relatively long response time thereof may likewise indicate relatively high network overhead associated with the participating node. Alternatively, or in addition, in an embodiment, the network overhead can be determined only for a participating node that is qualified for a coordinating node to reduce system overhead.

Table 1 shows an example of the network overhead associated with each of the first plurality of participating nodes. In this example, it is assumed that the TM $410_5$ is read-only and thus unqualified for a coordinating node. Table 1 shows the network overhead associated with each of the TMs $410_2$, $410_3$, $410_4$ and $410_6$. As shown in Table 1, the network overhead associated with a participating node is determined based on the number of hops from the participating node to another node within the environment 400. A value of the network overhead is simplified to equal to the number of hops between two nodes. It is to be understood that this is merely for the purpose of simplification and illustration, and the scope of the present disclosure is not limited thereto. For example, in an embodiment, the network overhead associated with a participating node may be determined based on other factors as described above. Further, in this example, it is assumed that the TM $410_1$ has already coordinated the TMs $410_2$ and $410_3$ to set up a connection between each other.

In an embodiment, the TM $410_1$ may select a node with the lowest total value of network overhead among the second plurality of participating nodes to be the second node. As shown in Table 1, two total values of network overhead associated with each of the TMs $410_2$, $410_3$, $410_4$ and $410_6$ are calculated, which can be used for selecting the second node in different cases.

In an embodiment, for example, the TM $410_1$ may estimate itself to be not performing properly and unable to survive until the 2PC completes. In this case, the right value, or the second number in each box, for the case that the TM $410_1$ fails may be considered for selecting the second node. That is, if there is a participating node with the lowest total value of network overhead in case that the TM $410_1$ fails, the participating node may be selected to be the second node.

In an embodiment, the TM $410_1$ may estimate itself to be not performing properly but able to survive until the 2PC completes. For example, the TM $410_1$ may intend to reduce its utilization of resources by switching the role of a coordinating node to a participating node so as to keep itself alive. In this case, the left value for the case that the TM $410_1$ operates well may be considered for selecting the second node. That is, if there is a participating node with the lowest total value of network overhead in case that the TM $410_1$ can operate well until the 2PC completes, the participating node can be selected to be the second node.

In the example as shown in Table 1, the TM $410_3$ may be selected to be the second node in both of the above two cases. However, it is to be understood that different TMs 410 may be selected as the second node based on different

TABLE 1

| Node | TM $410_1$ | TM $410_2$ | TM $410_3$ | TM $410_4$ | TM $410_5$ | TM $410_6$ | Total |
|---|---|---|---|---|---|---|---|
| TM $410_2$ | 1/NA | 0/0 | 2/1 | 1/1 | 3/2 | 3/2 | 10/6 |
| TM $410_3$ | 1/NA | 2/1 | 0/0 | 3/2 | 1/1 | 1/1 | 8/5 |
| TM $410_4$ | 2/NA | 1/1 | 3/2 | 0/0 | 4/3 | 4/3 | 14/9 |
| TM $410_6$ | 2/NA | 3/2 | 1/1 | 4/3 | 2/2 | 0/0 | 12/8 |

As shown in Table 1, the second row shows values of network overhead associated with the TM $410_2$, the third row shows values of network overhead associated with the TM $410_3$, the fourth row shows values of network overhead associated with the TM $410_4$, and the fifth row shows values of network overhead associated with the TM $410_6$. More particularly, two values of network overhead between two nodes are calculated, in which a left value is for the case that the first coordinating node operates well and the right value is for the case that the first coordinating node fails. The last column in Table 1 shows the sum of values of network overhead associated with each of the TMs $410_2$, $410_3$, $410_4$ and $410_6$.

Referring back to FIG. 6, the method 600 continues to block 620, where the TM $410_1$ selects, from the first plurality of participating nodes, the second node (that is, the candidate for the coordinating node) based on the obtained information. In an embodiment, the TM $410_1$ may first select, from among the first plurality of participating nodes, a second plurality of participating nodes by excluding a participating node that is unqualified for a coordinating node. Taking the example as shown in Table 1, the second plurality of participating nodes may include the TMs $410_2$, $410_3$, $410_4$ and $410_6$, since the TM $410_5$ is read-only and thus unqualified for a coordinating node. Then, the TM $410_1$ may select the second node from the second plurality of participating nodes.

information obtained by the TM $410_1$. For example, in an embodiment, the network overhead associated with each of the first plurality of participating nodes may be determined in a different way from that of Table 1, and thus a different TM 410 other than the TM $410_3$ may be selected as the second node. The scope of the present disclosure described herein is not limited in this aspect.

Referring back to FIG. 5, the method 500 may continue to block 520, where the coordinator, for example the TM $410_1$, activates the selected second node to be a second coordinating node while deactivating itself to be a participating node.

In an embodiment, prior to switching the role of a coordinating node to the TM $410_3$, the TM $410_1$ may decide to abort the transaction by sending a rollback command to each of the first plurality of participating nodes. For example, if a transactional update currently occurs at the TM $410_1$ and the TM $410_1$ estimates itself unable to survive until the 2PC completes, it may send a rollback command to abort the transaction. Alternatively, or in addition, if part of an application logic that has been executed by the TM $410_1$ might affect the result of the transaction and the TM $410_1$ estimates itself unable to complete the rest of the application logic, it may send a rollback command to abort the transaction.

Continuing, the TM $410_1$ may send a message to the TM $410_3$ so as to activate the TM $410_3$ to be the second coordinating node. In an embodiment, the TM $410_1$ may send the information about the topology as described above to the TM $410_3$. Alternatively, or in addition, the TM $410_1$ may also send transaction information stored in a log to the TM $410_3$. For example, the transaction information may indicate which participating nodes are involved in the transaction (such as identifiers of the involved participating nodes). In an embodiment, for example, in response to the message being received by the TM $410_3$, the TM $410_1$ is deactivated to be a participating node.

In block 530, the transaction may be performed based on a cooperation between the TM $410_1$ acting as a participating node and the TM $410_3$ acting as a coordinating node. In an embodiment, the transaction may be performed with the 2PC protocol. For example, the TM $410_1$ may attempt to complete the rest of its application logic as a special participating node. If the TM $410_1$ completes its application logic successfully, it may send a notification for the success to the TM $410_3$. If the TM $410_1$ updates some transactional resources (such as files or databases), it may also need to update related information to the TM $410_3$. Otherwise, if the TM $410_1$ is alive but finds it cannot complete its application logic (such as due to an unhealthy state), the TM $410_1$ may send a notification for a failure to the TM $410_3$. Moreover, if the TM $410_3$ cannot receive the notification within a period, a failure may be regarded to occur at the TM $410_1$. However, since the TM $410_1$ is simply a participating node in the 2PC, the 2PC will not be blocked any more.

Through the above descriptions, it will be understood that an embodiment of the present disclosure can solve the blocking issue of the traditional 2PC protocol with low system overhead. There is no need to host the coordinator on a costly powerful machine. Instead, the coordinator can be located on common X86 platforms to save the cost. Additionally, a transaction may not be needed to be divided into independent sub-transactions or to design complex compensation mechanism for ensuring data consistency. Further, an embodiment of the present disclosure can be implemented as an add-on without need to change any of existing 2PC implementations.

Figure 8:
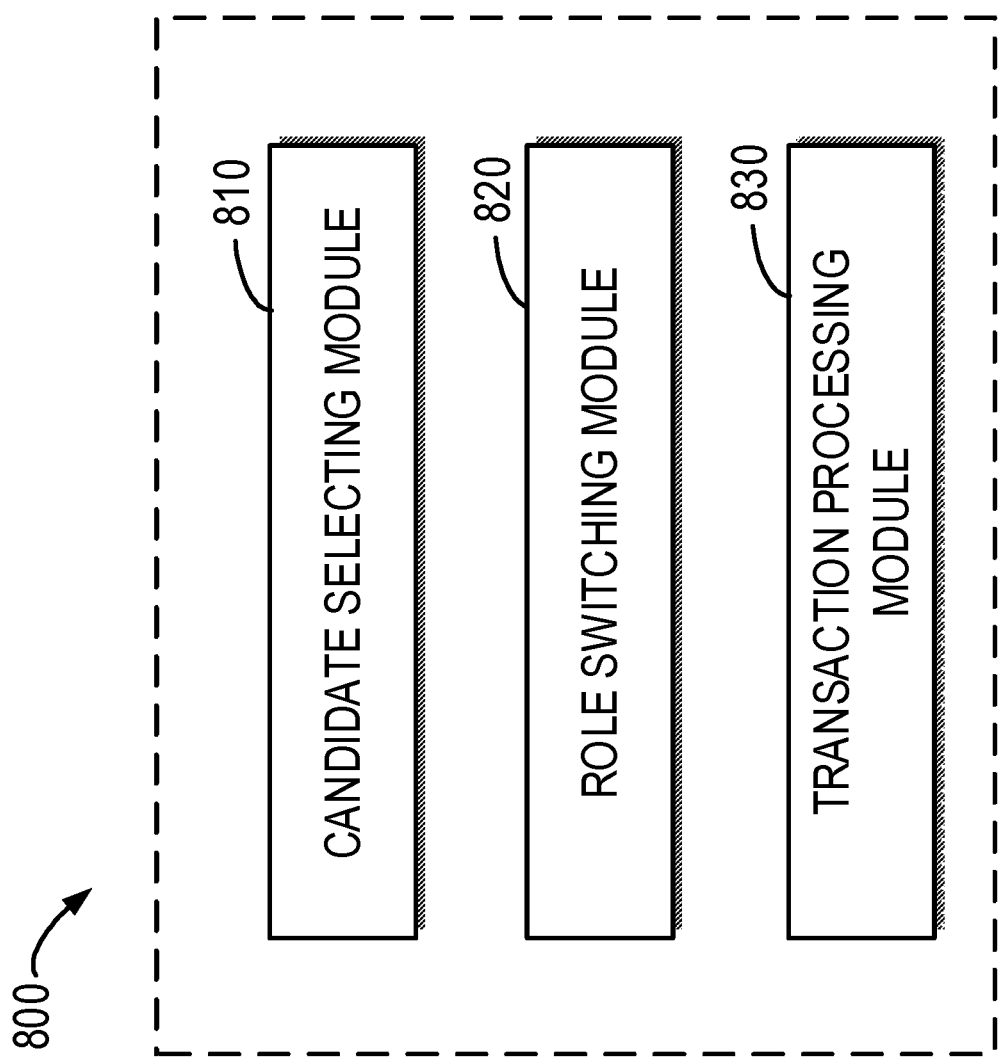
FIG. 8 illustrates a block diagram of an apparatus 800 for transaction processing in accordance with an embodiment of the present invention.

FIG. 8 illustrates a block diagram of an apparatus 800 for transaction processing in accordance with an embodiment of the present disclosure. As shown in FIG. 8, the apparatus 800 may comprise a candidate selecting module 810 configured to, in response to determining that a state of a first node acting as a first coordinating node in a distributed transaction processing environment is not performing properly, select a second node from a first plurality of participating nodes in the distributed transaction processing environment, the first plurality of participating nodes being communicatively coupled to the first node. The apparatus 800 may also comprise a role switching module 820 configured to activate the selected second node to be a second coordinating node while deactivating the first node to be a participating node. In addition, the apparatus 800 may also comprise a transaction processing module 830 configured to perform a transaction based on a cooperation between the first and second nodes.

For the sake of clarity, FIG. 8 does not illustrate some optional modules of the apparatus 800. However, it should be understood that various features as described with reference to FIGS. 4-7 are likewise applicable to the apparatus 800. Moreover, respective modules of the apparatus 800 may be hardware modules or software modules. For example, in an embodiment, the apparatus 800 may be implemented partially or completely by software and/or firmware, e.g., implemented as a computer program product embodied on the computer-readable medium. Alternatively, or in addition, the apparatus 800 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

The present invention may be a system, a method, and/or a computer program product at any possible technical detail level of integration. The computer program product may include a computer readable storage medium (or media) having computer readable program instructions thereon for a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to an embodiment of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to execute a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a distributed transaction processing environment, comprising:
   in response to determining that a state of a first node acting as a first coordinating node is not healthy based on at least one of: utilization of a processor of the first node, utilization of storage of the first node, network quality of the first node, and an input and output status of the first node, selecting a second node from a first plurality of participating nodes communicatively coupled to the first node prior to starting a "Two Phase Commit" (2PC) transaction, wherein the selecting a second node is dependent on a network overhead associated with each of the first plurality of participating nodes, wherein the network overhead comprises a number of hops from a participating node to another node of the first plurality of participating nodes operating well and a number of hops from a participating node to another node of the first plurality of participating nodes which fail;
   activating the selected second node to be a second coordinating node while deactivating the first node to be a participating node; and
   performing the 2PC transaction based on a cooperation between the first and second nodes.

2. The method of claim 1, wherein the selecting a second node comprises:
   obtaining first information about a topology among the first node and the first plurality of participating nodes, wherein the topology comprises relationship root node and leaf node identification between each of the first plurality of participating nodes in a tree-like structure; and
   selecting, from the first plurality of participating nodes, the second node based on the first information.

3. The method of claim 2, wherein the first plurality of participating nodes comprises a third node,
   the obtaining first information about a topology among the first node and the first plurality of participating nodes comprises:
      obtaining connection information associated with the third node, the connection information indicating network overhead associated with the third node; and
      obtaining node information associated with the third node, the node information indicating if the third node is qualified for a coordinating node; and
   the selecting the second node based on the first information comprises:
      in response to determining that the third node is qualified for a coordinating node and associated with the lowest network overhead among the first plurality of participating nodes, determining the third node to be the second node.

4. The method of claim 2, wherein the first information indicates a fourth node of the first plurality of participating nodes is read-only, and the selecting the second node based on the first information comprises:

selecting, from among the first plurality of participating nodes, a second plurality of participating nodes by excluding the fourth node; and selecting the second node from the second plurality of participating nodes.

5. The method of claim 2, wherein the activating the selected second node to be a second coordinating node comprises:

sending a message from the first node to the second node, the message including the first information and second information stored in the first node, the second information being related to the transaction.

* * * * *